M. T. MANOOG.
BELT.
APPLICATION FILED JUNE 11, 1910.
984,099.
Patented Feb. 14, 1911.
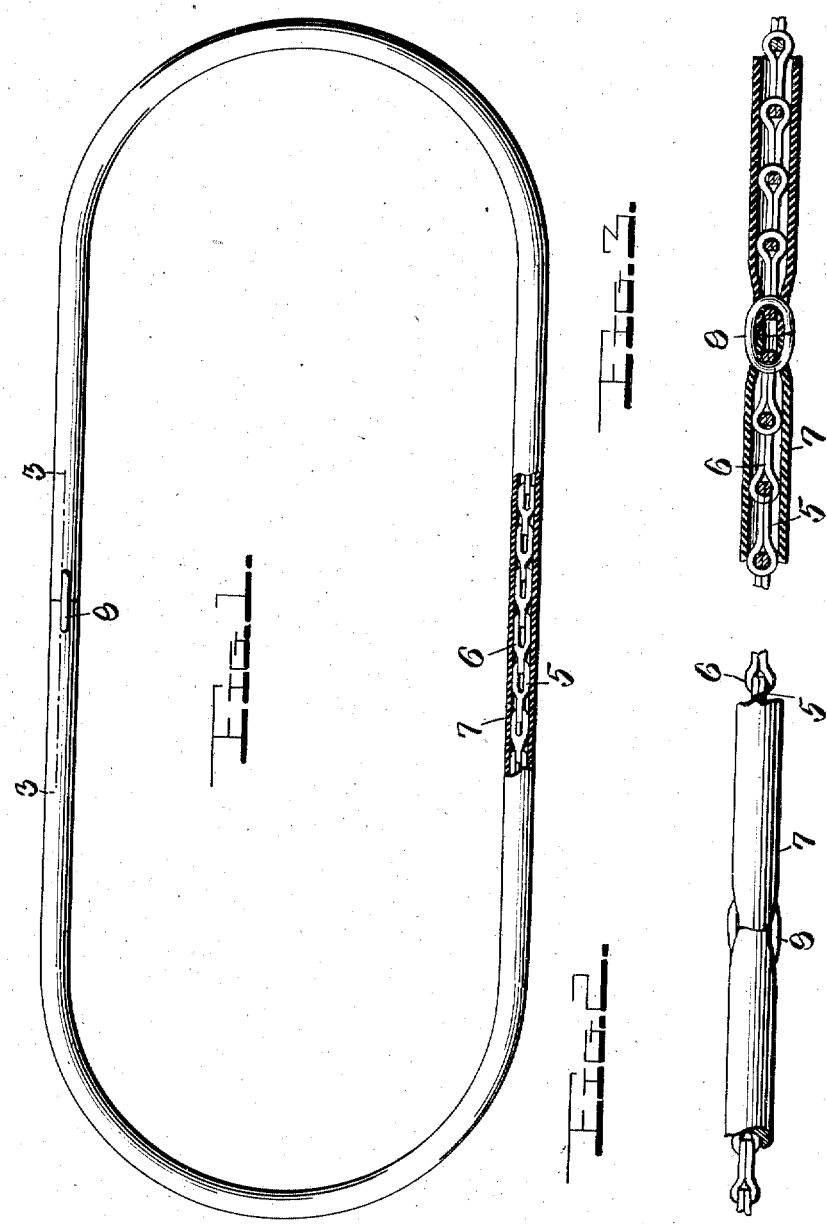
Witnesses
Chas. L. Griesbauer.
E. M. Ricketts
Inventor
M. T. Manoog,
By Watson E. Coleman.
Attorney

UNITED STATES PATENT OFFICE.

MANOOG T. MANOOG, OF BROCKTON, MASSACHUSETTS.

BELT.

984,099.  Specification of Letters Patent.  Patented Feb. 14, 1911.

Application filed June 11, 1910. Serial No. 566,395.

*To all whom it may concern:*

Be it known that I, MANOOG T. MANOOG, a subject of the Sultan of Turkey, residing at Brockton, in the county of Plymouth and State of Massachusetts, have invented certain new and useful Improvements in Belts, of which the following is a specification, reference being had to the accompanying drawings.

This invention relates to an improved driving belt and has for its object to provide a chain belt of that character used for driving various kinds of machinery.

The object of the invention resides in the provision of a steel link chain belt disposed within a round or oval flexible tube, of rubber or other composition material as may be most desirable for the use to which the belt is to be put.

A further object is to provide a flexible belt which is extremely durable and will not stretch, shrink or break as is a very common occurrence with the ordinary belt.

A further object is to provide a link chain belt provided with a covering of suitable friction material which will prevent the same from slipping.

With these and other objects in view, the invention consists of the novel features of construction, combination and arrangement of parts hereinafter fully described and claimed, and illustrated in the accompanying drawings, in which—

Figure 1 is a side elevation of a belt constructed in accordance with my invention, part of the casing or covering being broken away; Fig. 2 is an enlarged detail view of a portion of the belt showing the means for connecting the ends thereof; and Fig. 3 is a section taken on the line 3—3 of Fig. 1.

Referring more particularly to the drawings 5 indicates the chain made up of a plurality of links 6. These links may be of any approved form which will permit of the easy bending or flexing of the chain as it passes around a pulley or driving wheel.

7 indicates a covering preferably of rubber or canvas. This covering is in the form of a tube which may be round or oval in cross section and receives the link chain, said covering extending from end to end thereof. The ends of the chain and the covering are connected together by means of the link rod 8 which is extended through the ends of the covering and through the end links of the chain. This fastener may be made of such size as to just allow the same to be passed through the chain links, thus rendering the fastener extremely strong so that it will be almost impossible for the ends of the chain to separate. The fastener itself must break before this is possible.

A driving belt constructed in the manner above set forth has been found to be extremely durable and efficient in practical use. It eliminates many of the annoying features of the ordinary belt formed of leather or canvas, such as stretching which causes the belt to sag and slip, or shrinking and breaking of the belt both of which are extremely common occurrences with the ordinary driving belt. My improved belt will not break, shrink or stretch and when the covering has become so far worn that it cannot be further used, a new one may be supplied at a very slight expense if the chain is in sufficiently good condition to be continued in use. It will be understood that belts of any desired size may be made by employing the different sizes of link chains. They would each be provided with the same tubular covering, though for the larger belts a heavier covering would of course be required than for small belts which are used for driving light machines such as motorcycles, automobiles and similar vehicles.

Having thus described the invention, what is claimed is:—

In a belt of the character described, the combination of a steel link chain, a tubular rubber casing covering said chain and extending from end to end thereof, and a fastening link extended through said casing and the end links of the chain clenched upon the casing to securely fasten the ends of the chain and the casing together.

In testimony whereof I hereunto affix my signature in the presence of two witnesses.

MANOOG T. MANOOG.

Witnesses:
RAYMOND W. HIGGINS,
HARRY W. CLEMONS.